(12) United States Patent
Iwata

(10) Patent No.: US 10,852,460 B2
(45) Date of Patent: Dec. 1, 2020

(54) DIFFRACTION OPTICAL ELEMENT, MANUFACTURING METHOD THEREOF, AND OPTICAL APPARATUS

(71) Applicant: CANON KABUSHIKI KAISHA, Tokyo (JP)

(72) Inventor: Kenichi Iwata, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 16/048,715

(22) Filed: Jul. 30, 2018

(65) Prior Publication Data
US 2019/0041556 A1 Feb. 7, 2019

(30) Foreign Application Priority Data

Aug. 4, 2017 (JP) .................................. 2017-151683
Jul. 19, 2018 (JP) .................................. 2018-136002

(51) Int. Cl.
*G02B 5/18* (2006.01)
*B29D 11/00* (2006.01)
(Continued)

(52) U.S. Cl.
CPC ...... *G02B 5/1842* (2013.01); *B29D 11/00009* (2013.01); *B29D 11/0073* (2013.01);
(Continued)

(58) Field of Classification Search
CPC ............ G02B 27/0037; G02B 27/4211; G02B 27/0944; G02B 27/42; G02B 5/1814; G02B 5/1847; G02B 5/1861; G02B 5/1866; G02B 5/1876; G02B 5/1895; G02B 5/1852; G02B 5/1857; G02B 5/18; G02B 5/1842;
(Continued)

(56) References Cited

U.S. PATENT DOCUMENTS 6,101,035 A * 8/2000 Maruyama ............... G02B 9/14
                                                                            359/558
6,992,718 B1 * 1/2006 Takahara ............... G02B 23/14
                                                                            348/333.09
(Continued)

FOREIGN PATENT DOCUMENTS

JP 2007-212547 A 8/2007
JP 2013-205534 A 10/2013

*Primary Examiner* — William R Alexander
*Assistant Examiner* — Tamara Y. Washington
(74) *Attorney, Agent, or Firm* — Venable LLP

(57) ABSTRACT

There is provided a diffraction optical element which comprises a base material, and in which a first resin layer having a diffraction grating shape and a second resin layer are laminated on the base material. The diffraction grating shape forms a plurality of concentric annular sections when planarly viewed from a lamination direction of the diffraction optical element. The second resin layer comprises a first portion and a second portion, and the first portion is provided on a first annular section of the first resin layer. The second portion is continuously provided from above the first portion to above a region including a periphery of the first resin layer. A difference between a refractive index of the second portion on a center of the first annular section and a refractive index of the second portion on a circumference of the first annular section is within 0.0005.

9 Claims, 10 Drawing Sheets

(51) Int. Cl.
    *G02B 27/00*    (2006.01)
    *G02B 27/42*    (2006.01)
    *G02B 3/08*     (2006.01)

(52) U.S. Cl.
    CPC .......... *B29D 11/00769* (2013.01); *G02B 3/08* (2013.01); *G02B 27/0037* (2013.01); *G02B 27/4211* (2013.01); *B29D 11/00269* (2013.01); *G02B 5/1847* (2013.01)

(58) Field of Classification Search
    CPC ........ G02B 3/08; G02B 1/041; G02B 6/2931; G02B 1/14; G11B 7/1353; B29D 11/00269
    USPC .......................................................... 359/571
    See application file for complete search history.

(56) References Cited

U.S. PATENT DOCUMENTS

| | | | | |
|---|---|---|---|---|
| 8,750,671 B1* | 6/2014 | Kelly | ...................... | F21V 3/049 385/146 |
| 8,948,564 B1* | 2/2015 | Sherman | ................. | F21K 9/232 385/146 |
| 8,953,926 B1* | 2/2015 | Kelly | ...................... | F21K 9/232 385/146 |
| 9,366,791 B2 | 6/2016 | Iwata | | |
| 9,612,372 B2 | 4/2017 | Iwata | | |
| 10,431,618 B2* | 10/2019 | Matsugai | ......... | B29D 11/00375 |
| 2006/0050399 A1* | 3/2006 | Nakagawa | ............... | G02B 3/02 359/642 |
| 2008/0123048 A1* | 5/2008 | Volk | ....................... | G02C 7/061 351/159.42 |
| 2008/0123049 A1* | 5/2008 | Volk | ...................... | G02C 7/061 351/159.41 |
| 2009/0046379 A1* | 2/2009 | Kuramoto | ................ | G02B 3/00 359/718 |
| 2010/0238400 A1* | 9/2010 | Volk | ....................... | G02C 7/061 351/159.42 |
| 2012/0087008 A1* | 4/2012 | Ushigome | ............ | G02B 5/1895 359/576 |
| 2012/0112048 A1* | 5/2012 | Miyasaka | ............ | G11B 7/1353 250/216 |
| 2013/0064507 A1* | 3/2013 | Mahnkopf | ......... | G02B 6/12007 385/52 |
| 2014/0036368 A1* | 2/2014 | Kurata | ............ | B29D 11/00269 359/576 |
| 2015/0168666 A1* | 6/2015 | Brouwer | .......... | B29D 11/00307 359/811 |
| 2016/0077251 A1* | 3/2016 | Genda | .......... | B29D 11/00269 359/576 |
| 2018/0217361 A1* | 8/2018 | Yoshioka | ........... | G02B 13/0085 |
| 2018/0239069 A1* | 8/2018 | Iwata | ................... | G02B 5/1814 |
| 2018/0259749 A1* | 9/2018 | Moriya | ........... | B29D 11/00307 |
| 2019/0004293 A1* | 1/2019 | Hikichi | ............. | H01L 27/14685 |
| 2020/0004039 A1* | 1/2020 | Ogasahara | ............... | G02B 3/14 |
| 2020/0096790 A1* | 3/2020 | Blum | ....................... | G02C 7/06 |
| 2020/0124774 A1* | 4/2020 | Hoshi | .................. | H04N 5/2254 |

* cited by examiner

DIFFRACTION OPTICAL ELEMENT, MANUFACTURING METHOD THEREOF, AND OPTICAL APPARATUS

BACKGROUND OF THE INVENTION

Field of the Invention

The present invention relates to a diffraction optical element to be used in an optical apparatus such as a camera, a video camera or the like. In particular, the present invention relates to a diffraction optical element using two kinds of resins respectively having different optical characteristics and a manufacturing method thereof. Also, the present invention relates to an optical apparatus using the diffraction optical element.

Description of the Related Art

A diffraction optical element in which two kinds of resins respectively having different optical characteristics are used is known as an optical element to be used for a lens and the like. In this diffraction optical element, it is possible to suppress a chromatic aberration as a lens by utilizing a property that a chromatic aberration occurring in a diffraction optical system and a chromatic aberration occurring in a refractive optical system are quite opposite to each other, and it is also possible to realize significant size and weight reduction of an entire lens. Incidentally, various kinds of diffraction optical elements using two kinds of resins and methods for manufacturing the same have been proposed.

For example, Japanese Patent Application Laid-Open No. 2007-212547 discloses a diffraction optical element in which a first resin layer having a diffraction grating shape is provided in close relation on a first base material, a second resin layer is provided in close relation on the first resin layer, and these resin layers are sandwiched between the first base material and a second base material, and also discloses a manufacturing method of the same.

Besides, Japanese Patent Application Laid-Open No. 2013-205534 discloses a diffraction optical element in which a first resin layer having a diffraction grating shape is provided on a first base material, a second resin layer is provided on the first resin layer, an intermediate layer is provided on the second resin layer, and these resin layers are sandwiched between the first base material and a second base material, and also discloses a manufacturing method of the same.

However, in the diffraction optical element disclosed in Japanese Patent Application Laid-Open No. 2007-212547, a refractive index distribution occurs in the second resin layer within one annular section. FIGS. 1A and 1B are schematic cross-section diagrams for describing the diffraction optical element disclosed in Japanese Patent Application Laid-Open No. 2007-212547, wherein the left end is the center of the diffraction optical element and the range indicated by the lateral arrow is a first annular section. As illustrated in FIG. 1A, a second resin layer 104 is cured while being held between a second base material 102 and a first resin layer 103 having the diffraction grating shape provided on a first base material 101, so that the diffraction optical element is formed. Therefore, in the second resin layer 104, a cure shrinkage amount of a portion A is smaller than that of a portion B. Further, since the second resin layer 104 is held and restrained, this layer cannot be shrunk freely. Thus, the density of the portion A becomes sparse, whereas the density of the portion B becomes dense, so that a refractive index difference occurs between these portions (FIG. 1B). When imaging is performed using this diffraction optical element, a phase shift (deviation) of a transmitted wavefront occurs due to the refractive index difference occurring in one annular section of the second resin layer. Thus, there is a problem that a concentric striped pattern occurs in a blurred image (i.e., an image in a region outside a focal range of a lens).

The diffraction optical element disclosed in Japanese Patent Application Laid-Open No. 2013-205534 is different from the diffraction optical element disclosed in Japanese Patent Application Laid-Open No. 2007-212547 in the point that the intermediate layer exists on the second resin layer. Since the intermediate layer is provided with a thickness of about 40 µm for the purpose of mitigating an influence of the stepped shape of the first resin layer, refractive index differences occurring among the first resin layer, the second resin layer and the intermediate layer are small. Therefore, when imaging is performed using this relevant diffraction optical element, it is possible to suppress a concentric striped pattern as compared with the diffraction optical element disclosed in Japanese Patent Application Laid-Open No. 2007-212547. However, since the intermediate layer exists on the second resin layer, the total layer thickness is as thick as 80 µm or more. Therefore, when a temperature change occurs, the absolute amount of expansion and contraction of a diffraction grating layer (i.e., the first resin layer, the second resin layer and the intermediate layer) sandwiched between the two base materials increases, and an internal distortion caused by a difference in linear expansion coefficients between the base material and the diffraction grating layer increases. Thus, there is a problem that a crack occurs in the diffraction grating layer.

The present invention has been completed to cope with the above problems, and an object thereof is to provide a diffraction optical element which reduces the phase shift of the transmitted wavefront and in which the crack due to the temperature change does not occur.

SUMMARY OF THE INVENTION

A diffraction optical element of the present invention for solving the above problems is characterized in that a base material is provided, a first resin layer having a diffraction grating shape is laminated on the base material, a second resin layer is laminated on the first resin layer, the diffraction grating shape forms a plurality of concentric annular sections when planarly viewed from the lamination direction of the diffraction optical element, the second resin layer comprises a first portion and a second portion, the first portion is provided on a first annular section which is a circle surrounding the center of the diffraction optical element among at least the plurality of annular sections of the first resin layer, the second portion is continuously provided from above the first portion to above a region including the periphery of the first resin layer, and a difference between a refractive index of the second portion on the center of the first annular section and a refractive index of the second portion on the circumference of the first annular section is within 0.0005.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings.

(Diffraction Optical Element)

Figure 2A:
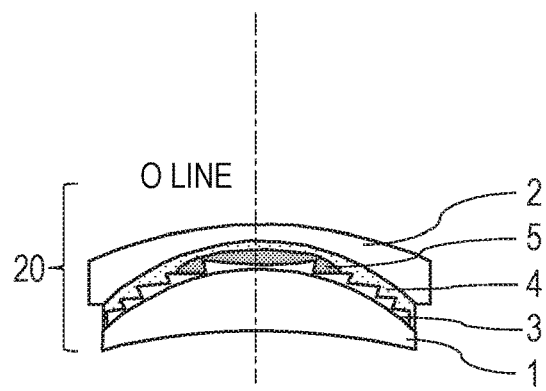
FIGS. 2A, 2B, 2C and 2D are schematic diagrams for describing a diffraction optical element according to an embodiment of the present invention.

FIGS. 2A to 2D are schematic diagrams for describing a diffraction optical element according to an embodiment of the present invention, wherein FIG. 2A is the cross-section diagram passing through the center of the diffraction optical element.

A diffraction optical element 20 is composed of a first base material 1, a second base material 2, and a diffraction grating layer sandwiched between them.

For example, as the first base material 1 and the second base material 2, S-LAH55 (manufactured by OHARA INC.) which is a lanthanum-type high refractive index and low dispersion glass of, S-FPL51 (manufactured by OHARA INC.) which is an ultra-low dispersion glass, and the like can be used.

In order to obtain high diffraction efficiency in a wide wavelength band, as a resin for forming the diffraction grating layer, it is preferable to use a resin with a high refractive index and low dispersion in one side and a resin with a low refractive index and high dispersion in the other. In order to obtain high diffraction efficiency of 99% or more in the entire visible region, it is preferable to use a material having a linear dispersion characteristic that a partial dispersion ratio θgF is smaller than that of an ordinary resin for the low refractive index and high dispersion resin. In order to obtain this linear dispersion characteristic, a method of dispersing and mixing inorganic fine particles in a base resin is known, and titanium oxide, indium tin oxide, zirconium oxide or the like can be suitably used. As the base resin, an ultraviolet curable resin is preferable, and particularly an acrylate resin is preferable. Besides, it is preferable that the first resin layer contains the resin with the low refractive index and high dispersion, and the second resin layer contains the resin with the high refractive index and low dispersion.

The diffraction grating layer is composed of a first resin layer 3 which has a concentric diffraction grating shape, and a second resin layer which comprises a first portion 5 and a second portion 4. The first resin layer 3, the second portion 4 and the first portion 5 are in close contact with others. The second resin layer is composed of the second portion 4 and the first portion 5 which is provided on the vicinity of the center of the first resin layer. The second portion 4 is continuously provided from above the first portion 5 to above a region including the periphery of the first resin layer. Here, it is preferable that the first portion 5 and the second portion 4 are made of the same resin. Also, it is preferable that a refractive index at the center of the first portion is larger than a refractive index at the center of the second portion. This is because it is possible to reduce a phase shift of a transmitted wavefront caused by a refractive index difference and, as its effect, to reduce center brightness of a striped pattern by about 10%.

Although the above diffraction optical element has the second base material 2, it may or may not have the second base material. This is because there is no large difference in optical performance obtained as a diffraction grating.

Figure 2B:
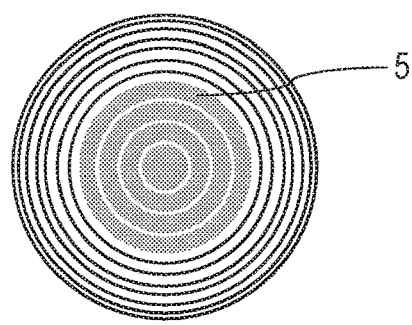

FIG. 2B is the top view of the diffraction optical element as viewed from a lamination direction (i.e., the direction of an optical axis O).

The diffraction grating shape of the first resin layer 3 is a concentric relief pattern which is composed of N circles (N is an integer of two or more) centered on the optical axis O when planarly viewed from the lamination direction. A grating pitch in the relief pattern is large near the center of the diffraction optical element and small toward the periphery. The first portion 5 has a circular shape which is provided on the vicinity of the center of the first resin layer 3 when planarly viewed from the lamination direction.

Figure 2C:
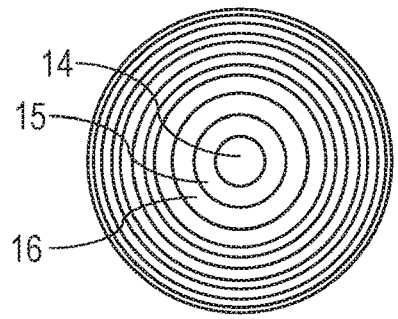

FIG. 2C is the explanatory diagram of the annular sections. In the present application, a circle region which surrounds the center of the diffraction optical element and the center of the diffraction grating shape is referred to as a first annular section 14. A region which is surrounded by the second circle counted from the center and the circle surrounding the center is referred to as a second annular section 15, and a region which is surrounded by the third circle counted from the center and the second circle is referred to as a third annular section 16. That is, a region which is surrounded by an Nth circle counted from the center and an (N−1)th circle counted from the center is called an Nth annular section. Here, the first portion 5 is preferably a true circle, but the first portion 5 may be provided on the same annular section of the diffraction grating shape of the first resin layer 3. This is because even in a case where there are some gaps or a circular arc shape is linear, if the first portion is provided on the same annular section of the diffraction grating shape of the first resin layer 3, the effect of the present invention is exerted.

Here, the first portion 5 is formed on at least the first annular section 14. This is because, in the first annular section 14, the grating pitch is the largest and the distance between a sparse part and a dense part caused by cure shrinkage (see FIG. 1B) is long, whereby the refractive index difference is liable to occur and an influence on optical characteristics is large as compared with another annular section.

Figure 3A:
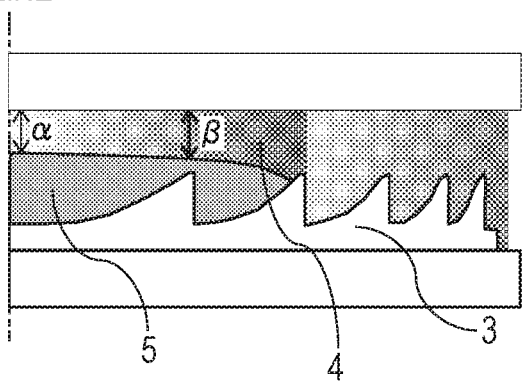
FIGS. 3A and 3B are cross-section diagrams respectively for describing the diffraction optical element according to the embodiment of the present invention and the diffraction optical element in the related background art.
Figure 3B:
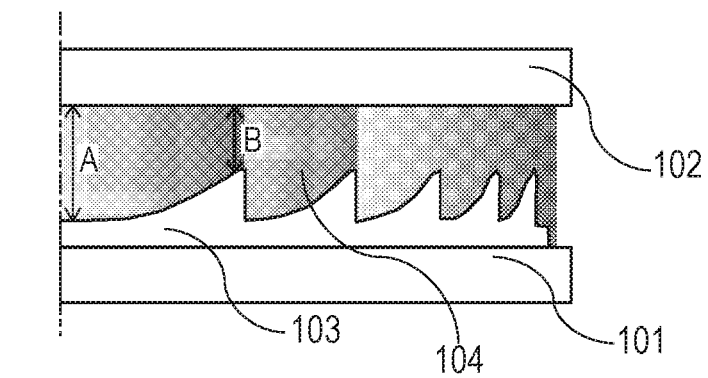

FIG. 3A is a cross-section diagram for describing the diffraction optical element according to the embodiment of the present invention. FIG. 3B is a cross-section diagram for describing the diffraction optical element in which the second resin layer is formed of a uniform member as disclosed in Japanese Patent Application Laid-Open No. 2007-212547. Each of these cross-section diagrams is drawn so that the left end thereof is the center of the diffraction optical element. In FIG. 3B, a position A corresponds to the maximum film thickness of the second resin layer 104 in the first annular section, and a position B corresponds to the minimum film thickness of the second resin layer 104 in the first annular section. On the other hand, since the diffraction optical element of the present invention has the first portion 5, the respective thicknesses of the second resin layer at positions α and β in FIG. 3A are substantially the same, and a difference of the cure shrinkage amounts in the first annular section is small. Therefore, the refractive index difference in the first annular section is also small, so that it is possible to reduce the phase shift of the transmitted wavefront. More specifically, as the refractive index difference, a difference between the refractive index of the second portion at the center (position α) of the first annular section and the refractive index of the second portion at the circumference (position β) of the first annular section can be set within 0.0005 or less. As just described, by reducing the refractive index difference in the first annular section, it is possible to reduce the phase shift of the transmitted wavefront.

In the diffraction optical element of the present invention, by satisfying the above requirements, it is possible to reduce the phase shift of the transmitted wavefront caused by the refractive index difference in the same annular section.

Besides, it is more preferable that the difference between the refractive index of the second portion on the center of the first annular section and the refractive index of the second portion on the periphery of the first resin layer is within 0.0005. This is because it is possible to further reduce the phase shift of the transmitted wavefront.

Besides, it is preferable that the film thickness of the first portion is larger than the height of the wall surface portion of the first resin layer. This is to prevent a refractive index distribution from occurring in the same annular section with respect to the film thickness of the second portion. More specifically, it is preferably to set the film thickness to about 10 μm to 30 μm, more preferably, to 12 μm to 25 μm.

The transmitted wavefront of the diffraction optical element of the present invention can be measured by the following method, for example. First, using the diffraction optical element as a diffraction lens, the optical system is designed so that primary diffracted light is focused. Next, a laser interferometer is used, and an object to be measured and a reflection mirror are arranged in this order for the laser interferometer. Next, the reflection mirror is adjusted to the focal position of the diffraction optical element, the transmitted wavefront of the diffraction optical element is measured, and the phase shift in the annular section and the phase shift between the annular sections are calculated. A measurement wavelength λ of the interferometer is, for example, 632.8 nm. It is preferable that the shift of the transmitted wavefront is at most 0.05λ or less.

The transmitted wavefront of the diffraction optical element can also be evaluated by a photograph taken using the lens mounted with this diffraction optical element. More specifically, the transmitted wavefront can be evaluated based on a relationship between a deformation amount of the second resin layer and a brightness difference in a bright and dark striped pattern in a blurred image of the taken photograph. This is because the phase shift of the transmitted wavefront appears as the concentric bright and dark striped pattern in the blurred image of the taken photograph, but the brightness difference and a contrast value of the bright and dark are equal to a degree of the phase shift of the transmitted wavefront. The brightness difference in the bright and dark striped pattern in the blurred image of the photograph can be analyzed using general image processing software.

Figure 2D:
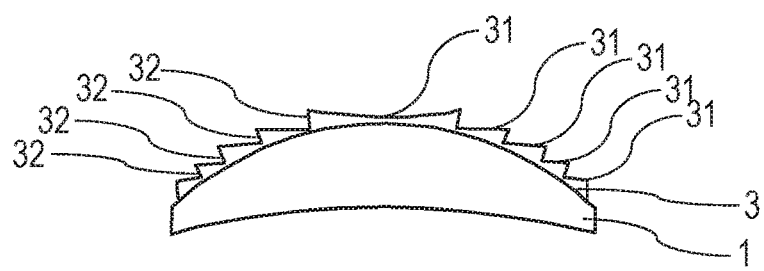

Here, if it is assumed that an area of the surface where the first portion 5 is in contact with a slant surface portion 31 of the first resin layer is S1 and an area of the surface where the second resin layer (the first portion and the second portion) is in contact with the slant surface portion 31 of the first resin layer is S2, S2 is larger than S1. FIG. 2D is the schematic diagram of the first resin layer 3. Since the diffraction grating shape of the first resin layer 3 is composed of the slant surface portions 31 and wall surface portions 32, S1 and S2 do not include the area of the surface which is in contact with the wall surface portion 32 of the first resin layer.

It is also preferable that S1/S2 is 13% or less. This is because, when S1/S2 is 13% or less, surface accuracy of the diffraction optical element is particularly excellent. Since the film thickness of the second portion 4 is thin in the region above the first portion 5 and thick in the region above the first resin layer 3, a difference occurs in shrinkage amounts of these two regions if the second resin layer is cured. However, if S1/S2 is 13% or less, the shrinkage amount of the second portion becomes dominant in these two regions. As a result, the shrinkage in the radial direction of the second resin layer is substantially uniform irrespective of the first portion and the second portion, and the surface is not distorted, so that it is possible to obtain the diffraction optical element having the satisfactory surface accuracy. For example, S1 and S2 can be measured by cutting the diffraction optical element with a straight line passing through the optical axis O and obtaining the cross-sectional image of the cross section by an electron microscope.

For example, the surface accuracy of the diffraction optical element of the present invention can be measured by the laser interferometer. It is preferable that an astigmatic number and a xenomorphic number (irregularity) in an optically effective portion of the diffraction optical element are respectively 0.5 or less. This is because, by setting the astigmatic number and the xenomorphic number to be within the above range, the diffraction optical element of the present invention has particularly excellent optical characteristics.

Besides, in the diffraction optical element of the present invention, it is preferable that the sum of the layer thickness of the first resin layer 3 and the layer thickness of the second resin layer is 70 μm or less. This is because occurrence of a later-described crack can be prevented even if a temperature change occurs. The sum of the layer thicknesses is more preferably 60 μm or less.

Figure 4A:
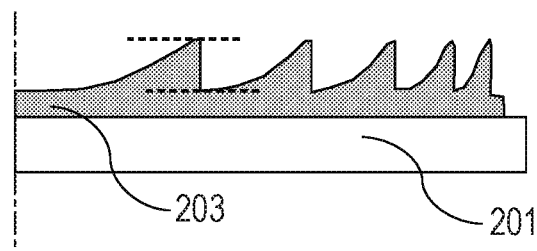
FIGS. 4A, 4B and 4C are schematic diagrams for describing a diffraction optical element in the related background art.
Figure 4B:
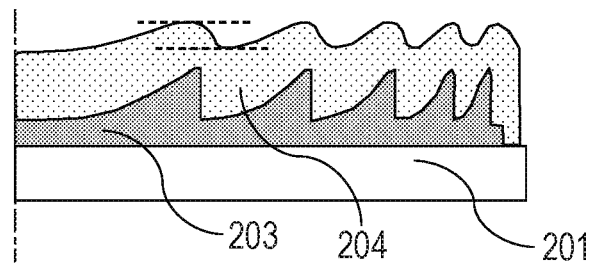
Figure 4C:
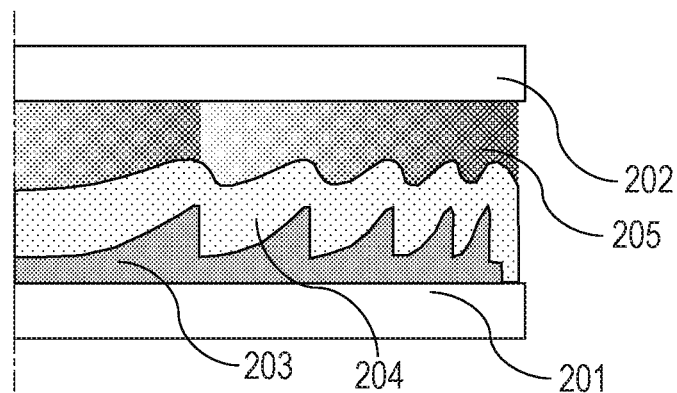

Subsequently, a crack occurrence mechanism will be described with reference to FIGS. 4A to 4C. FIGS. 4A to 4C are the schematic diagrams for describing the diffraction optical element disclosed in Japanese Patent Application Laid-Open No. 2013-205534. A second resin layer 204 is provided in close contact with a first resin layer 203 provided on a first base 201. A third resin layer 205 of about 40 μm is provided between a second base material 202 and the second resin layer 204 for the purpose of mitigating an influence of the grating shape of the first resin layer (FIG. 4C). In the portion corresponding to the second resin layer of the present invention, there are the two layers of the second resin layer 204 and the third resin layer 205, and the film thickness thereof is as thick as 80 μm or more.

A glass to be preferably used as the first base 201 has a linear expansion coefficient as small as $6.0\times10^{-6}$/K to $9.0\times10^{-6}$/K. On the other hand, if the resin of the diffraction grating layer is an acrylate type, the linear expansion coefficient is as large as $4.5\times10^{-5}$/K to $7.0\times10^{-5}$/K. Here, the Young's modulus of the glass is about 80 GPa, while the Young's modulus of the resin is 2 GPa to 3 GPa. Therefore, the resin is easier to deform than the glass. When a temperature changes, the resin tries to deform at the interface with the glass, but deformation is suppressed by the glass. On the other hand, deformation corresponding to the linear expansion coefficient of the resin occurs in a portion away from the interface with the glass. As a result, the resin has a region with a small deformation amount and a region with a large deformation amount within the diffraction grating layer, which becomes a distortion causing the crack when the temperature changes. As just described, when the portion corresponding to the second resin layer of the present invention becomes thick, the absolute amount of expansion and contraction increases and the distortion also increases, whereby there is a possibility that the crack tends to occur against the temperature change.

Incidentally, the occurrence of the crack in the diffraction optical element can be decided, for example, by leaving the diffraction optical element in a thermostatic chamber at −40° C. for a certain period of time and detecting whether or not the crack will occur.

As described above, in the diffraction optical element of the present invention, it is possible to reduce the phase shift of the transmitted wavefront caused by the refractive index difference, and simultaneously to prevent the crack due to the expansion and contraction of the diffraction grating layer with respect to the base material at the time of the temperature change.

(Manufacturing Method of Diffraction Optical Element)

A manufacturing method of the diffraction optical element according to the present invention will be described below.

FIGS. 5A to 5E are diagrams for describing forming steps of forming the first resin layer of the diffraction optical element according to the embodiment of the present invention.

First, a first resin 6 containing a photosetting (or photocurable) resin or a thermosetting resin is provided between a mold 7 having a shape obtained by reversing the diffraction grating shape and the base material 1. The following is an example in which an ultraviolet curable resin is used as the first resin 6.

Figure 5A:
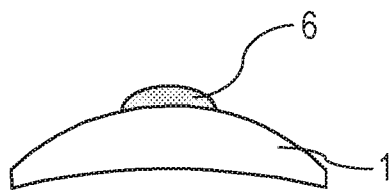
FIGS. 5A, 5B, 5C, 5D and 5E are diagrams for describing steps of forming a first resin layer of the diffraction optical element according to the embodiment of the present invention.
Figure 5B:
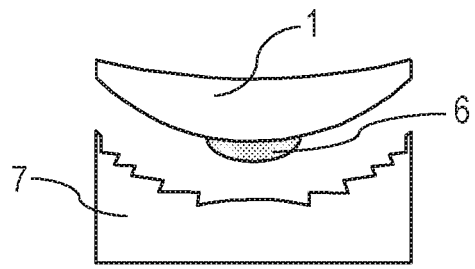
Figure 5C:
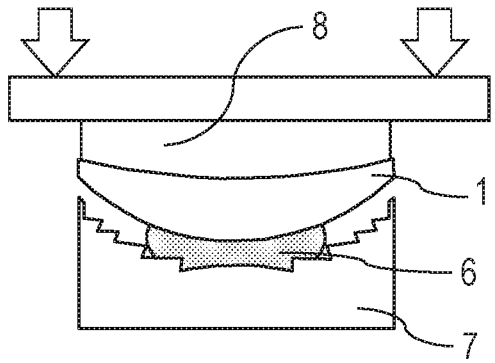

More specifically, as illustrated in FIG. 5A, the resin containing the ultraviolet curable resin is dropped as the first resin 6 onto the first base material 1 by a dispenser. Next, as illustrated in FIG. 5B, the mold 7 having the shape obtained by reversing the diffraction grating shape is prepared. The material of the mold is preferably a stainless steel (a SUS (Steel Use Stainless) material, a STAVAX material manufactured by Bohler-Uddeholm Corp. or the like), a NiP material or the like, from the viewpoints of processability, durability, adhesion to resin, and the like. If necessary, a coating such as CrN may be applied. The base material 1 onto which the first resin 6 has been dropped is placed on the mold 7 and the base material 1 is gradually lowered, so that the dropped first resin 6 and the mold 7 are brought into contact with each other. The first resin 6 is filled between the base material 1 and the mold 7 so as not to involve air (bubbles). At this time, pressure is applied via a pressurizing glass 8 to the first resin 6 provided between the base material 1 and the mold 7, so that the first resin is pressed and expanded to outside the optical effective region of the diffraction optical element (FIG. 5C). The pressurizing glass 8 is used for uniformly pressurizing the base material 1, the side of the glass being in contact with the base material 1 has a spherical shape having the same curvature as that of the base material 1, and the opposite side thereof has a planar shape perpendicular to the pressurizing direction. It is preferable that the material of the glass has a high ultraviolet transmissivity, and more preferably the material is the same as the base material 1. The pressure to be applied to the pressurizing glass is determined depending on a viscosity of the resin to be used, the shape of the base material, and the like. If the pressure is in the range of 0.01 N/mm² to 10 N/mm², problems such as a filling property, bubble entrainment and the like do not occur.

Next, the first resin 6 is cured by applying light energy, so that the first resin layer 3 of the diffraction grating shape having a plurality of concentric annular sections when planarly viewed from a lamination direction.

Figure 5D:
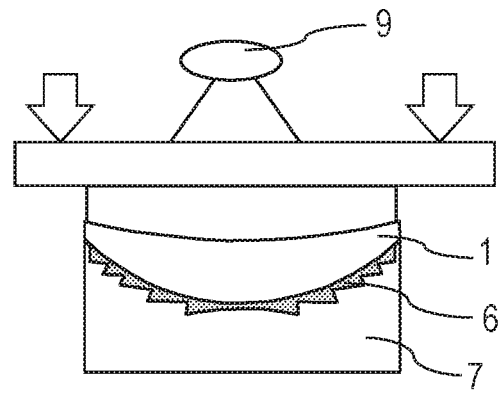

More specifically, as illustrated in FIG. 5D, ultraviolet rays are irradiated from an ultraviolet irradiation light source 9 through the base material 1 to cure the first resin 6, thereby forming the first resin layer 3 on the base material 1. An irradiation amount of the ultraviolet rays is preferably set to be within the range of a curing reaction rate of 80% or more and 100% or less. When the curing reaction rate is less than 80%, the shape changes greatly when the resin is released from the mold, whereby there is a fear that transfer accuracy of the mold is lowered. The ultraviolet irradiation amount at which the curing reaction is completed is determined depending on a resin to be used, a base material, and the like. In case of the acrylate resin, the irradiation amount of 0.5 J/cm² to 50 J/cm² is necessary. The reaction rate of the ultraviolet curable resin can be calculated using an FT-IR (Fourier transform infrared spectrometer). More specifically, a concentration of wave number (809 cm$^{-1}$) represented by vibration of C=C double bond contributing to the curing reaction and a concentration of the wave number (763 cm$^{-1}$) represented by vibration of C—C single bond not contributing to the curing reaction are measured, a ratio of these concentrations is calculated for each irradiation amount, and the calculated ratio is set as the reaction rate by comparison with an initial value (irradiation amount 0). It is possible to previously set an irradiation condition by performing the above calculations.

Next, the first resin layer 3 is released from the mold 7.

Figure 5E:
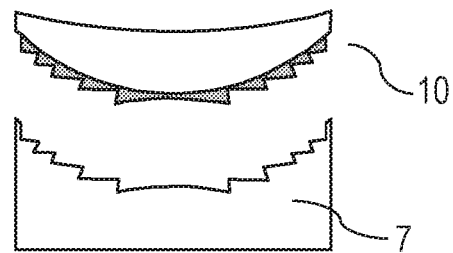

After the curing is completed, as illustrated in FIG. 5E, the first resin layer 3 integrated with the base material 1 is released from the mold 7 to obtain a molding lens 10. As a method of releasing the resin layer, any methods such as push-up by an ejector, cooling and the like may be used unless a molded grating is damaged.

Next, the second resin 11 containing the photocurable resin or the thermosetting resin is provided on the center of the first resin layer 3. The following is an example using an ultraviolet curable resin as the second resin 11.

FIGS. 6A to 6F are diagrams for describing forming steps (bonding steps) of the second resin layer of the diffraction optical element according to the embodiment of the present invention.

Figure 6A:
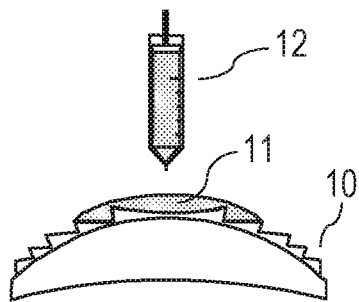
FIGS. 6A, 6B, 6C, 6D, 6E and 6F are diagrams for describing steps of forming a second resin layer of the diffraction optical element according to the embodiment of the present invention.

More specifically, a resin containing the ultraviolet curable resin as the second resin 11 is dropped onto the molding lens 10 by using a micro-discharge dispenser 12 (FIG. 6A). The amount and position of dropping can be appropriately adjusted according to required levels of the grating shape and the concentric striped pattern. Although a guideline for adjustment will be described later, since the dropping amount is several microliter level and the dropping range φ is several millimeters level, the dispenser is required to control the discharge amount at sub microliter level. Here, the dropping area of the resin is preferably axially symmetric with respect to the optical axis. This is because there is a correlation in an angle formed by the region where the refractive index changes and the optical axis. Besides, it is preferable to clean the molding lens 10 before dropping the second resin 11 so as not to damage the molded grating, and remove particles before the bonding process.

Next, the second resin 11 is cured by applying light energy, and the first portion 5 of the second resin layer is formed on at least the first annular section of the first resin layer 3.

Figure 6D:
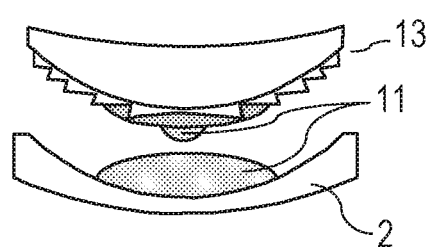
Figure 6B:
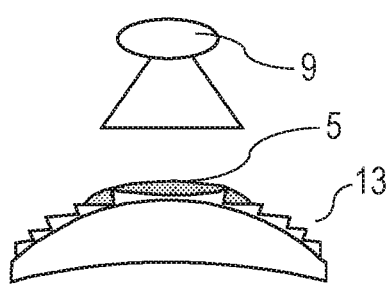

More specifically, the dropped small amount of the second resin 11 is cured by irradiating ultraviolet rays from the ultraviolet irradiation light source 9, thereby obtaining a molding lens 13 (FIG. 6B). Generally, in an ultraviolet curable acrylate resin, there is a case where polymerization is inhibited because oxygen reacts with radicals necessary for polymerization and consumes the radicals. In case of curing a small amount of ultraviolet curable resin, it is more susceptible to inhibition by oxygen because of its large specific surface area. Consequently, the ultraviolet irradiation is preferably carried out under a low oxygen atmosphere such as under a vacuum atmosphere, a nitrogen atmosphere or the like.

Figure 1A:
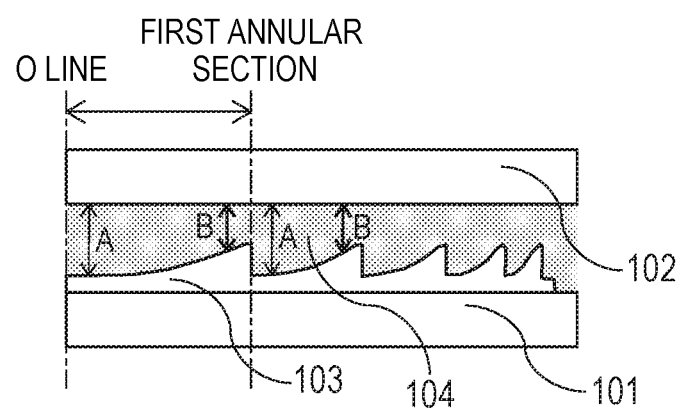
FIGS. 1A and 1B are schematic diagrams for describing a diffraction optical element in the related background art.
Figure 1B:
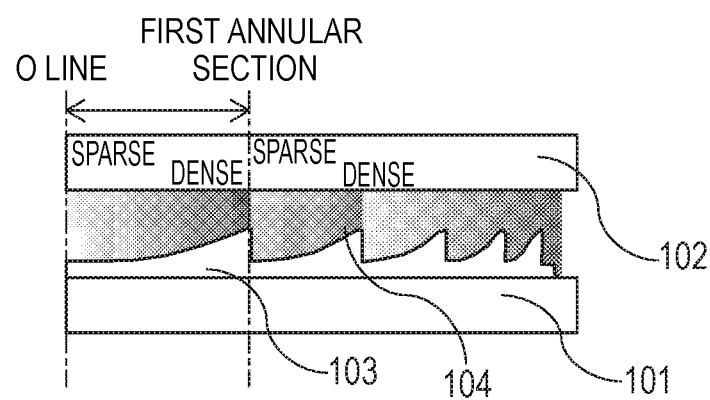

When curing the first portion 5, since the first portion 5 is not pressed or the like in its thickness direction, the first portion is cured and shrunk according to the shrinkage ratio of the resin without any restraint. For this reason, there is no radial density difference as illustrated in FIG. 1B, and no refractive index difference occurs in the radial direction in the formed first portion 5.

Next, a third resin is provided on the first resin layer 3 and the first portion 5. The following is an example in which the second resin is used as the third resin.

Figure 6E:
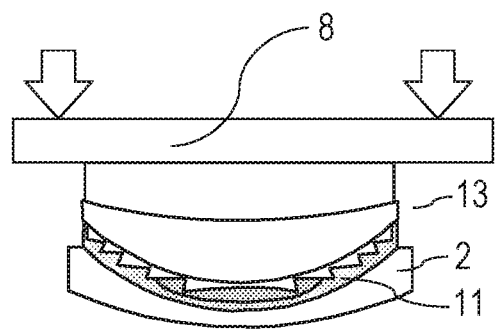
Figure 6C:
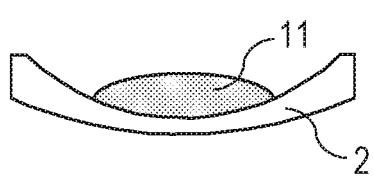

More specifically, as illustrated in FIG. 6C, the second resin 11 is dropped by the dispenser onto the second base material 2 by an amount necessary as a bonding layer. At this time, it is preferable to drop a part of the necessary amount onto the molding lens 13. By dropping the second resin 11 necessary for the bonding separately onto the second base material 2 and the molding lens 13, it is possible to perform the bonding while preventing bubbles from entering. This is because a risk of bubble interfusion in contact between liquids is low as compared with contact between liquid and solid. Besides, it is possible to reduce the bubble interfusion by reducing the dropping amount of one of the resins, reducing the curvature, and making multipoint contacts. As illustrated in FIG. 6D, the second base material 2 onto which the second resin 11 has been dropped is brought close to the molding lens 13 at a relative speed of 0.1 mm/sec, and they are brought into contact with each other. Thereafter, the pressurizing glass 8 is pressed in a state of being installed on the upper surface of the molding lens 13, thereby completing the filling of the second resin 11 (FIG. 6E).

Further, light energy is applied to cure the second resin 11, and the second portion 4 of the second resin layer is continuously formed from above the first portion 5 to above the region including the periphery of the first resin layer 3.

Figure 6F:
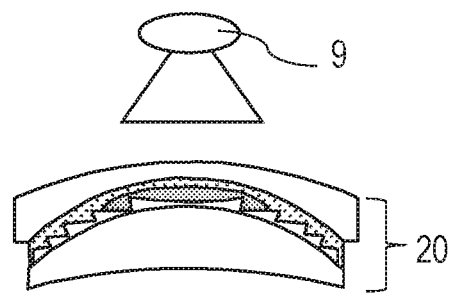

More specifically, ultraviolet rays are irradiated from the ultraviolet irradiation light source 9 to cure the second resin 11, thereby continuously forming the second portion 4 of the second resin layer from above the first portion 5 to above the region including the periphery of the first resin layer 3. Thus, the diffraction optical element is obtained (FIG. 6F).

In case of the curing, the second portion 4 is shrunk while being restrained by the second base material 2. Since the first portion 5 has been formed, there is no density difference in the annular section, but the entire second portion 4 is uniformly rough. On the other hand, since the first portion 5 is cured and shrunk without any restraint as described above, the first portion is denser than the second portion 4, and the refractive index of the first portion is higher than that of the second portion 4.

Here, in the step of forming the first portion of the second resin layer, it is assumed that the area of the surface where the first portion is in contact with the slant surface portion of the first resin layer is S1. Further, it is assumed that the area of the surface where the second resin layer (the first portion and the second portion) is in contact with the slant surface portion of the first resin layer is S2. Here, as previously described with reference to FIG. 2D, S1 and S2 do not include the area of the surface which is in contact with the wall surface portion 32 of the first resin layer. At this time, it is preferable that the first portion 5 is formed so that S1/S2 is 13% or less. This is because, when S1/S2 is 13% or less, the surface accuracy of the obtained diffraction optical element is particularly excellent. Since the film thickness of the second portion 4 is thin in the region above the first portion 5 and thick in the region above the first resin layer 3, the difference occurs in the shrinkage amounts of these two regions if the second resin layer is cured. However, if S1/S2 is 13% or less, the shrinkage amount of the second portion becomes dominant. As a result, the shrinkage in the radial direction of the second resin layer is substantially uniform irrespective of the first portion and the second portion, and the surface is not distorted, so that it is possible to obtain the diffraction optical element having the satisfactory surface accuracy.

In the manufacturing method of the diffraction optical element described above, although the first portion and the second portion of the second resin layer are manufactured using the same material, different materials may be used.

Besides, the diffraction optical element obtained by the manufacturing method of the diffraction optical element described above has the second base material 2. However, the second base material may be released from the mold after the processing step of FIG. 6F. This is because there is no large difference in optical performance obtained as the diffraction grating.

Hereinafter, the guideline for adjustment of the drop amount and position when the second resin 11 is dropped onto the molding lens 10 using the micro-discharge dispenser 12 (FIG. 6A) will be described.

Figure 7:
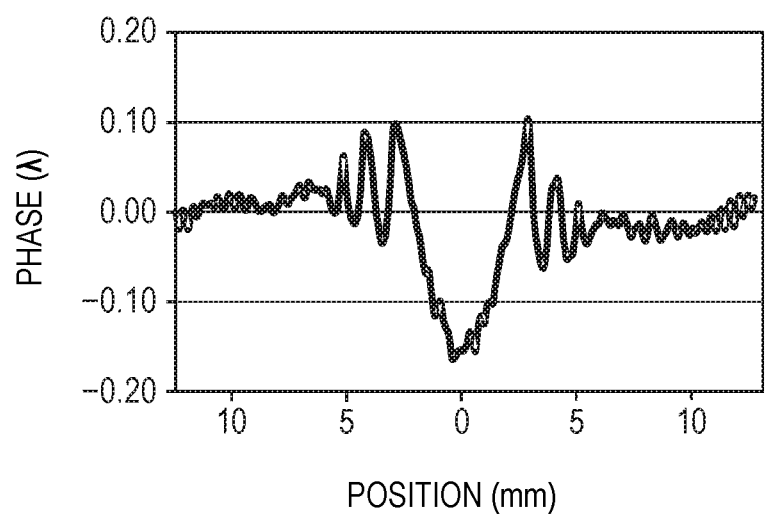
FIG. 7 is a graph for describing a relationship of a phase shift of a transmitted wavefront of the diffraction optical element in the related background art.

FIG. 7 is a graph for describing the phase shift of the transmitted wavefront of the diffraction optical element in the related background art, wherein the horizontal axis indicates a distance (mm) from the element center and the vertical axis indicates the phase shift (λ) of the transmitted wavefront at that position. As just described, the value of the phase shift of the transmitted wavefront, which is a factor of the concentric striped pattern, increases in the vicinity of the element center and decreases toward the periphery. This is because of the following reason. Namely, in the vicinity of the center, a grating pitch is large and a distance between the sparse and dense parts occurred due to cure shrinkage is long, so that a density difference tends to be occurred. On the other hand, since a grating pitch is small on the periphery, a distance between the sparse and dense parts which cause a density difference is not obtained, so that averaging is obtained.

Figure 8:
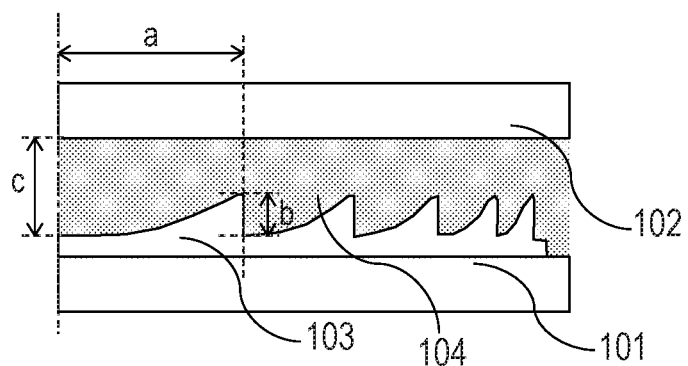
FIG. 8 is a cross-section diagram of a diffraction optical element in the related background art.

FIG. 8 is a cross-section diagram of the diffraction optical element in which the second resin layer which is similar to the related background art and made of the uniform resin, and is an explanatory diagram of the shape of the second resin layer 104. In the figure, a represents the grating pitch, b represents the grating height, and c represents the maximum film thickness of the second resin layer in each annular section. Here, thickness unevenness of the second resin layer in a light ray direction (i.e., the vertical direction in FIG. 8) is expressed by a ratio (c−b)/c of the maximum film thickness and the minimum film thickness of the second resin layer in the annular section. Then, as a product of the thickness unevenness represented by (c−b)/c and the grating pitch a increases, the phase shift of the transmitted wavefront increases. On the other hand, when the grating height b=0, it means a flat shape with no grating height, in which case there is no phase shift of the transmitted wavefront. From this, the phase shift of the transmitted wavefront is correlated with the following expression (1).

$$(1-(c-b)/c) \times a \quad (1)$$

Figure 9A:
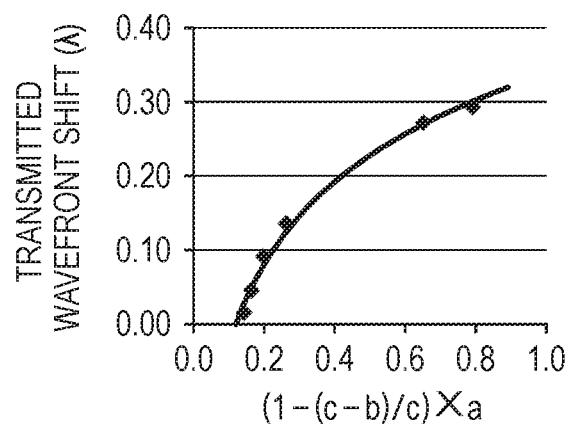
FIGS. 9A and 9B are diagrams for describing a relationship between a shape of a second resin layer and a phase shift of a transmitted wavefront in the related background art.
Figure 9B:
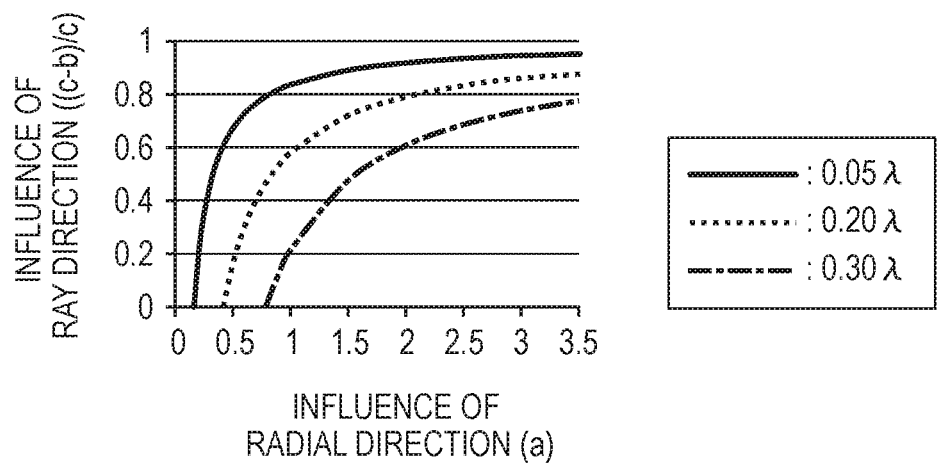

FIG. 9A is graph for describing a result obtained by measuring the phase shift, calculated by the expression (1), of the transmitted wavefront of the diffraction optical element having the shape of the second resin layer. In the figure, the horizontal axis indicates the numerical values calculated by the above expression (1), and the vertical axis indicates the phase shift amounts of the transmitted wavefront calculated for each annular section and also indicates the approximate line passing through the respective plotted points. In the correlation, the approximate expression changes depending on the refractive index difference between the two resins constituting the diffraction grating layer. FIG. 9A shows a result which is obtained from the diffraction optical element having the diffraction efficiency of 95% or more and the grating height of about 10 µm to 20 µm. From this result, it is possible from the grating shape of the diffraction optical element to predict the phase shift amount of the transmitted wavefront of the diffraction optical element in which the second resin layer is made of the uniform resin. Here, FIG. 9B is a graph in which the expression (1) is divided into an influence factor a in the radial direction and a thickness unevenness factor in the optical axis direction, and these factors are converted into a relationship with the predicted value (calculated from the approximate expression) of the phase shift amount of the transmitted wavefront obtained from FIG. 9A. In FIG. 9B, the horizontal axis indicates the grating pitch a and the vertical axis represents (c−b)/c, and the graph is made for each phase shift amount of the transmitted wavefront. More specifically, as the phase shift amount of the transmitted wavefront, 0.05λ, 0.20λ and 0.30λ are graphed. To achieve the required phase shift amount, the three parameters a, b and c need to be adjusted.

In the present invention, it is possible to change the grating height b and the maximum film thickness c of the second resin layer in the annular section by the bonding process illustrated in FIGS. 6A to 6F. With respect to the amount and position of dropping by the micro-discharge dispenser, it only has to carry out discharging, filling and curing so as to satisfy the value of c calculated from FIG. 9B.

As described above, according to the manufacturing method of the diffraction optical element of the present invention, it is possible to provide the diffraction optical element which reduces the phase shift of the transmitted wavefront and simultaneously prevents the crack due to the expansion or contraction of the diffraction grating layer and the base material at the time of the temperature change.

(Optical Apparatus)

Subsequently, an optical apparatus of the present invention will be described. The optical apparatus according to the present invention is an optical apparatus which comprises a housing and an optical system disposed inside the housing, wherein the optical system includes the diffraction optical element and lenses.

Figure 10:
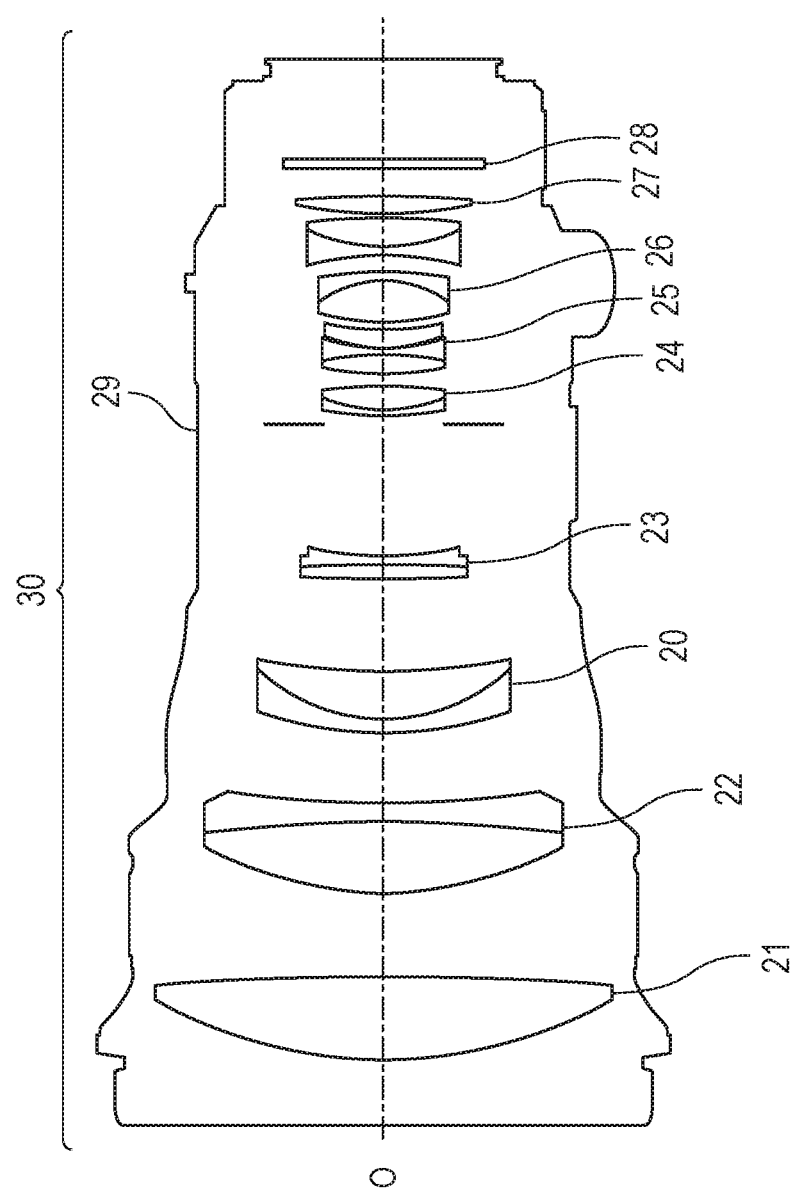
FIG. 10 is a schematic diagram for describing an optical apparatus according to the embodiment of the present invention.

FIG. 10 is a cross-section diagram of an optical system of an interchangeable lens barrel of a single lens reflex camera which is an example of the optical apparatus according to the present invention. In the optical system of a lens barrel 30, lenses 21 to 28 and the diffraction optical element 20 are arranged perpendicular to the optical axis O inside a housing 29. Here, the side of the lens 21 is the surface of the lens barrel, whereas the side of the lens 28 is a detachable mount side with the camera.

By disposing the diffraction optical element 20 of the present invention at an appropriate position of the optical system, it is possible to provide the compact and lightweight lens barrel in which the concentric striped patterns are reduced and chromatic aberration is reduced. Further, by providing the diffraction optical element 20 inside the lens 21 as illustrated in FIG. 10, it is possible to prevent external light from impinging directly on the diffraction optical element 20, and it is thus possible to suppress flare.

EXAMPLES

Subsequently, the diffraction optical element of the present invention and the manufacturing method thereof will concretely be described with reference to examples. Here, it should be noted that the present invention is not limited by the following examples.

Example 1

The diffraction optical element was manufactured by the manufacturing method described in FIGS. 5A to 5E and FIGS. 6A to 6F. As the base material 1, the material having the diameter φ55 mm obtained by processing the glass material (S-FPL manufactured by OHARA INC.) into the spherical shape (it is designed that the molding surface of the first resin layer 3 has the convex shape with the radius of curvature R200 and the opposite surface has the radius of curvature R150) was used. The molding surface of the first resin layer was subjected to coupling treatment for the purpose of enhancing the adhesion to the resin. The coupling solution was prepared by dissolving 3-Methacryloxypropyl trimethoxysilane (KMB-503 manufactured by Shin-Etsu Chemical Co., Ltd.) in the mixed solution of water and ethanol (10% water) at the concentration of 5% and adding acetic acid 0.5% as the pH adjuster. This coupling solution was applied by the spray coater and dehydrated and dried in the oven at 100° C. for one hour. On the opposite surface, the antireflection film composed of $SiO_2$ and $SiO$ was formed.

For the mold 7, the base of stainless steel (STAVAX manufactured by Bohler-Uddeholm Corp.) plated with NiP by 200 µm was processed into the sawtooth cross-sectional shape by the grinder.

Next, the first resin 6 was prepared. First, the material containing urethane-modified polyester acrylate as the main component and containing the photoreaction initiator (Irgacure 184 manufactured by Ciba-Geigy Japan Ltd.) was prepared. Then, 50 mg of the ultraviolet curable resin in which indium tin oxide fine particles were dispersed was dropped onto the base material 1 using the dispenser (MEASURING MASTER MPP-1 manufactured by Musashi Engineering, Inc.) (FIG. 5A). The base material 1 was slowly lowered at speed 0.1 mm/sec to bring the dropped resin into contact with the base material 1. Then, the resin sandwiched between the base material 1 and the mold was expanded to outside the optically effective portion while not entrapping air (bubbles) (FIGS. 5B and 5C). At this time, the pressurizing glass 8 made of the same material as the base material 1 was placed on the base material 1, and uniform pressure was applied from above to fill the resin.

In this state, the resin was irradiated with ultraviolet rays through the pressurizing glass and the base material 1 and cured (FIG. 5D). For the irradiation of the ultraviolet rays, the ultraviolet-ray irradiating apparatus (UV light source UL750 manufactured by HOYA CANDEO OPTRONICS CORPORATION) was used, and the irradiation amount of this UV light source was 15 J/cm$^2$ (irradiation for 1000 seconds at illuminance of 15 mW/cm$^2$). After completion of the irradiation, the base material 1 integrated with the resin is released from the mold, and the molding lens 10 on which the first resin layer of the diffraction grating shape having the plurality of concentric annular sections when planarly viewed from the lamination direction was formed was obtained (FIG. 5E).

Next, the first portion of the second resin layer was formed on the first resin layer. More specifically, first, as the second resin 11, the material containing urethane-modified polyester acrylate as the main component and containing the photoreaction initiator (Irgacure 184 manufactured by Ciba-Geigy Japan Ltd.) was prepared. Then, 3.0 mg of the ultraviolet curable resin in which zirconia dioxide fine particles were dispersed was dropped onto the molding lens 10 obtained above using the micro-discharge dispenser (high-precision dispenser R-Jet™ manufactured by Engineering System Co., Ltd.) (FIG. 6A). The molding lens 10 was moved using the stage so that the center of the concentric circle comes directly beneath the dispenser. The contact of the dropped resin with the slant surface portion of the first resin layer was φ6 mm and within the first annular section. With respect to the area of the region coated with the resin, S1 which is the area of the surface where the first portion of the second resin layer is in contact with the slant surface portion of the first resin layer corresponded to 1% of S2 which is the area of the surface where the second resin layer is in contact with the slant surface portion of the first resin layer. In this state, the molding lens 10 was placed in the vacuum chamber and depressurized up to 100 Pa. Thereafter, ultraviolet rays were irradiated to the ultraviolet curable resin dropped onto the molding lens 10, through the quartz window of the vacuum chamber (FIG. 6B). The UV light source UL750 described above was used as the ultraviolet-ray irradiating apparatus, and the irradiation amount of the ultraviolet rays was 200mJ/cm$^2$ (irradiation for 20 seconds at illuminance of 10 mW/cm$^2$).

Next, in order to form the second portion of the second resin layer, 362 mg of the resin necessary for the bonding was dropped onto the base material 2 to be bonded with the molding lens, by using the dispenser (MPP-1) (FIG. 6C). As the base material 2, the material having the diameter φ60 mm obtained by processing the glass material (S-LAH55 manufactured by OHARA INC.) into the spherical shape (it is designed that the molding surface of the first resin layer 3 has the concave shape with the radius of curvature R200 and the opposite surface has the radius of curvature R300) was used. The base material 2 was subjected to coupling treatment on the molding surface of the first resin layer 3 as well as the case of the base material 1. On the opposite surface, the antireflection film composed of SiO2 and SiO was formed.

Thereafter, the molding lens and the base material 2 were bonded in the bonding apparatus (FIG. 6D). By using this apparatus, the base material 2 (concave shape) was placed on the lower side and fixed, and the molding lens (convex shape) was brought in the opposite direction and brought closer to the base material 2 at constant speed. Here, the SUS spacer having the thickness of 60 μm was inserted between the molding lens and the base material 2 in advance. After bringing the molding lens close to the base material 2 at descending speed of 0.1 mm/sec and completely bringing the lens into contact, the pressurizing glass was placed on the molding lens, and constant pressure (10 kgf) was applied to lower the molding lens until the lens strikes the spacer (FIG. 6E). After the resin was completely filled between the molding lens and the base material 2 and thus repulsive force of the resin disappeared, the spacer and the pressuring glass were removed. In this state, ultraviolet rays were irradiated from the side opposite to the molding lens to cure the filled resin, thereby obtaining the diffraction optical element 20 (FIG. 6F). The UV light source UL750 described above was used as the ultraviolet-ray irradiating apparatus, and the irradiation amount of the ultraviolet rays was set to 32 J/cm$^2$.

When the transmitted wavefront of this diffraction optical element was measured by the laser interferometer, the phase shift of the transmitted wavefront at the center of the element showed the maximum value of 0.02λ in the first annular section. The element was designed as the diffraction lens so that primary diffracted light is focused. First, using the interferometer (Laser Interferometer GPI manufactured by ZYGO CORPORATION), the object to be measured and the reflection mirror were arranged in this order from the interferometer. Next, the reflection mirror was adjusted to the focal position of the element, the transmitted wavefront of the element was measured, and the phase shift in the annular section and the phase shift between the annular sections were calculated. The measurement wavelength λ of the interferometer is 632.8 nm. When the blurred image photograph was taken by the lens equipped with this diffraction optical element, no concentric striped pattern or central bright spot was seen in the blurred image.

The element made as above was cut in half and processed so as to pass the optical axis O. The reflectance of each layer in its cross section was measured, and the refractive index was calculated from the measured result. As a result, the refractive index of the second portion of the second resin layer on the center of the first annular section was larger by 0.0002 than the refractive index of the second portion of the second resin layer on the circumference of the first annular section. Besides, the refractive index of the second portion of the second resin layer on the center of the first annular section was larger by 0.0002 than the refractive index of the second portion of the second resin layer on the periphery of the first resin layer. The refractive index of the first portion was larger by 0.00045 than the refractive index of the second portion of the second resin layer on the center of the first annular section. Further, when the surface accuracy of this element was measured by the laser interferometer, the astigmatic number was 0.33 and the xenomorphic number was 0.43 in the optically effective portion.

The diffraction optical element was placed in the low-temperature (−40° C.) test tank and follow-up observation was performed. Then, no failure such as a crack or the like occurred even after one month elapsed. Besides, when the blurred image photograph was taken by the lens equipped with the diffraction optical element after the endurance test, the same result as before the endurance test was obtained.

Example 2

The molding lens was prepared in the same manner as in Example 1. Next, the same photoreaction initiator as in Example 1 was prepared. Then, 10.0 mg of the ultraviolet curable resin in which the zirconia dioxide fine particles were dispersed was dropped onto the molding lens obtained as above in the same manner as in Example 1. The contact of the dropped resin with the first resin layer was φ12 mm and in the state of being applied to the inner side than the fourth annular section. With respect to the area of the region coated with the resin, S1 which is the area of the surface where the first portion of the second resin layer is in contact with the slant surface portion of the first resin layer corresponded to 5% of S2 which is the area of the surface where the second resin layer is in contact with the slant surface portion of the first resin layer. In this state, the molding lens was placed in the vacuum chamber, and ultraviolet rays were irradiated to the ultraviolet curable resin under the same condition as in Example 1.

Then, 355 mg of the resin necessary for the bonding was dropped onto the base material 2 to be bonded with the molding lens, by using the dispenser (MPP-1). As the base material 2, the material for which the glass material, the spherical shape and the coupling treatment are the same as in Example 1 was used.

Thereafter, the molding lens and the base material 2 were bonded in the bonding apparatus in the same manner as in Example 1, thereby obtaining the diffraction optical element.

When the transmitted wavefront of this diffraction optical element was measured by the laser interferometer in the same manner as in Example 1, the phase shift of the transmitted wavefront at the center of the element showed the maximum value of 0.02λ in the first annular section. When the blurred image photograph was taken by the lens equipped with this diffraction optical element, no concentric striped pattern or central bright spot was seen in the blurred image.

The element manufactured as described above was processed in the same manner as in Example 1, and the refractive index thereof was calculated by performing reflectance measurement. As a result, the refractive index of the second portion of the second resin layer on the center of the first annular section was larger by 0.0002 than the refractive index of the second portion of the second resin layer on the circumference of the first annular section. Besides, the refractive index of the second portion of the second resin layer on the center of the first annular section was larger by 0.0002 than the refractive index of the second portion of the second resin layer on the periphery of the first resin layer. Besides, the refractive index of the first portion was larger by 0.00040 than the refractive index of the second portion of the second resin layer on the center of the first annular section. Further, when the surface accuracy of this element was measured by the laser interferometer in the same manner as in Example 1, the astigmatic number was 0.35 and the xenomorphic number was 0.42 in the optically effective portion.

The diffraction optical element was placed in the low-temperature (−40° C.) test tank and follow-up observation was performed. Then, no failure such as a crack or the like occurred even after one month elapsed. Besides, when the blurred image photograph was taken by the lens equipped with the diffraction optical element after the endurance test, the same result as before the endurance test was obtained.

Comparative Example 1

The molding lens was prepared in the same manner as in Example 1. Next, the same photoreaction initiator as in Example 1 was prepared. Then, 370 mg of the ultraviolet curable resin in which the zirconia dioxide fine particles were dispersed was dropped onto the molding lens in the same manner as in the process of forming the second portion in Example 1. Therefore, this comparative example is different from Example 1 in that the process of forming the first portion was not performed. As the base material 2, the material for which the glass material, the spherical shape and the coupling treatment are the same as in Example 1 was used.

Thereafter, the molding lens and the base material 2 were bonded in the bonding apparatus in the same manner as in Example 1, thereby obtaining the diffraction optical element.

When the transmitted wavefront of this diffraction optical element was measured by the laser interferometer in the same manner as in Example 1, the phase shift of the transmitted wavefront at the center of the element showed the maximum value of 0.29λ in the first annular section. When the blurred image photograph was taken by the lens equipped with this diffraction optical element, the concentric striped pattern occurred in the blurred image, and also the bright spot was seen in the center portion thereof. The element manufactured as described above was processed in the same manner as in Example 1, and the refractive index thereof was calculated by performing reflectance measurement. As a result, the refractive index of the second portion of the second resin layer on the center of the first annular section was smaller by 0.0100 than the refractive index of the second portion of the second resin layer on the circumference of the first annular section. Besides, the refractive index of the second portion of the second resin layer on the center of the first annular section was smaller by 0.0100 than the refractive index of the second portion of the second resin layer on the periphery of the first resin layer.

The diffraction optical element was placed in the low-temperature (−40° C.) test tank and follow-up observation was performed. Then, no failure such as a crack or the like occurred even after one month elapsed.

Comparative Example 2

The molding lens was prepared in the same manner as in Example 1. Next, the first portion of the second resin layer was formed on the entire surface of the first resin layer of the molding lens by using the second resin. The resin used was the ultraviolet curable resin in which the photoreaction initiator (Irgacure 184 manufactured by Ciba-Geigy Japan Ltd.) and the zirconia dioxide fine particles were dispersed in the main component of urethane modified polyester acrylate. Then, 440 mg of this resin was dropped onto the flat-shape mold and the molding lens by using the dispenser (MPP-1). The mold made of Teflon™ was used. After gradually lowering the molding lens at speed of 0.1 mm/sec to bring the dropped resin into contact with the molding lens, the resin in the space sandwiched between the molding lens and the mold was expanded to φ55 mm being the same region as that the grating layer was formed, while not entrapping air (bubbles). In this state, ultraviolet rays were irradiated to the resin through the molding lens to cure the second resin layer. Here, the ultraviolet-ray irradiating apparatus was used, and the irradiation amount thereof was set to 32 J/cm². After completion of the irradiation, the molding lens on which the second resin layer was formed was released from the mold.

Next, in order to form the second portion, 300 mg of the ultraviolet curable resin same as that for forming the second resin layer was dropped onto the molding lens on which the second resin layer was formed and the base material 2, by using the dispenser (MPP-1). As the base material 2, the material for which the glass material, the spherical shape and the coupling treatment are the same as in Example 1 was used.

Thereafter, the molding lens and the base material 2 were bonded to each other in the bonding apparatus. By using this apparatus, the base material 2 (concave shape) was placed on the lower side and fixed, and the molding lens (convex shape) was brought in the opposite direction and brought closer to the base material 2 at constant speed. Here, the SUS spacer having the thickness of 85 μm was inserted between the molding lens and the base material 2 in advance. After bringing the molding lens close to the base material 2 at descending speed of 0.1 mm/sec and completely bringing the lens into contact, the pressurizing glass was placed on the molding lens, and constant pressure (10 kgf) was applied to lower the molding lens until the lens strikes the spacer. After the resin was completely filled between the molding lens and the base material 2 and thus repulsive force of the resin disappeared, the spacer and the pressuring glass were removed. In this state, ultraviolet rays were irradiated from the side opposite to the molding lens to cure the filled resin, thereby obtaining the diffraction optical element. The UV light source UL750 described above was used as the ultraviolet-ray irradiating apparatus, and the irradiation amount of the ultraviolet rays was set to 32 J/cm². Here, the sum of the thickness of the first resin layer and the thickness of the second resin layer (comprising the first portion and the second portion) was 80 μm.

When the transmitted wavefront of this diffraction optical element was measured by the laser interferometer in the same manner as in Example 1, the phase shift of the transmitted wavefront at the center of the element showed the maximum value of 0.05λ in the first annular section. When the blurred image photograph was taken by the lens equipped with this diffraction optical element, the concentric striped pattern and the bright spot at the center were of almost no problem level. The element manufactured as described above was processed in the same manner as in Example 1, and the refractive index was calculated by performing reflectance measurement. As a result, the refractive index of the second portion of the second resin layer on the center of the first annular section was smaller by 0.0010 than the refractive index of the second portion of the second resin layer on the circumference of the first annular section. Besides, the refractive index of the second portion of the second resin layer on the center of the first annular section was smaller by 0.0012 than the refractive index of the second portion of the second resin layer on the periphery of the first resin layer.

When the appearance of this diffraction optical element was confirmed, it was found that the end of the element was shining. Further, when the cross section thereof was observed, it was found that peeling occurred at the interface between the second portion of the second resin layer and the base material 2 at the end of the element.

Besides, the diffraction optical element was placed in the low-temperature (−40° C.) test tank and follow-up observation was performed. Then, when the element was taken out after ten days, the second resin layer was cracked on the entire surface of the element.

Example 3

The molding lens was prepared in the same manner as in Example 1. Next, the photoreaction initiator same as in Example 1 was prepared. Then, 35.0 mg of the ultraviolet curable resin in which the zirconia dioxide fine particles were dispersed was dropped onto the molding lens obtained above in the same manner as in Example 1. The contact of the dropped resin with the slant surface portion of the first resin layer was φ20 mm and in the state of being applied to the inner side than the 11th annular section. With respect to the area of the region coated with the resin, S1 which is the area of the surface where the first portion of the second resin layer is in contact with the slant surface portion of the first resin layer corresponded to 13% of S2 which is the area of the surface where the second resin layer is in contact with the slant surface portion of the first resin layer. In this state, the molding lens was placed in the vacuum chamber, and ultraviolet rays were irradiated to the ultraviolet curable resin under the same condition as in Example 1.

Then, 332 mg of the resin necessary for the bonding was dropped onto the base material 2 to be bonded with the molding lens, by using the dispenser (MPP-1). As the base material 2, the material for which the glass material, the spherical shape and the coupling treatment are the same as in Example 1 was used.

Thereafter, the molding lens and the base material 2 were bonded in the bonding apparatus in the same manner as in Example 1, thereby obtaining the diffraction optical element.

When the transmitted wavefront of this diffraction optical element was measured by the laser interferometer in the same manner as in Example 1, the phase shift of the transmitted wavefront at the center of the element showed the maximum value of 0.02λ in the first annular section. When the blurred image photograph was taken by the lens equipped with this diffraction optical element, no concentric striped pattern or central bright spot was seen in the blurred image. Further, when the surface accuracy of this element was measured similarly by the laser interferometer, the astigmatic number and the xenomorphic number were both 0.45 in the optically effective portion.

The element manufactured as described above was processed in the same manner as in Example 1, and the refractive index thereof was calculated by performing reflectance measurement. As a result, the refractive index of the second portion of the second resin layer on the center of the first annular section was larger by 0.0002 than the refractive index of the second portion of the second resin layer on the circumference of the first annular section. Besides, the refractive index of the second portion of the second resin layer on the center of the first annular section was larger by 0.0003 than the refractive index of the second portion of the second resin layer on the periphery of the first resin layer. Besides, the refractive index of the first portion was larger by 0.00050 than the refractive index of the second portion of the second resin layer on the center of first annular section.

The diffraction optical element was placed in the low-temperature (−40° C.) test tank and follow-up observation was performed. Then, no failure such as a crack or the like occurred even after one month elapsed. Besides, when the blurred image photograph was taken by the lens equipped with the diffraction optical element after the endurance test, the same result as before the endurance test was obtained.

Example 4

The molding lens was prepared in the same manner as in Example 1. Next, the photoreaction initiator same as in Example 1 was prepared. Then, 50.0 mg of the ultraviolet curable resin in which the zirconia dioxide fine particles were dispersed was dropped onto the molding lens obtained above in the same manner as in Example 1. The contact of the dropped resin with the slant surface portion of the first resin layer was φ26 mm and in the state of being applied to the inner side than the 19th annular section. With respect to the area of the region coated with the resin, S1 which is the area of the surface where the first portion of the second resin layer is in contact with the slant surface portion of the first resin layer corresponded to 22% of S2 which is the area of the surface where the second resin layer is in contact with the slant surface portion of the first resin layer. In this state, the molding lens was placed in the vacuum chamber, and ultraviolet rays were irradiated to the ultraviolet curable resin under the same condition as in Example 1.

Then, 370 mg of the resin necessary for the bonding was dropped onto the molding lens and the base material 2 by using the dispenser (MPP-1). As the base material 2, the material for which the glass material, the spherical shape and the coupling treatment are the same as in Example 1 was used.

Thereafter, the molding lens and the base material 2 were bonded in the bonding apparatus in the same manner as in Example 1, thereby obtaining the diffraction optical element.

When the transmitted wavefront of this diffraction optical element was measured by the laser interferometer in the same manner as in Example 1, the phase shift of the transmitted wavefront at the center of the element showed the maximum value of 0.03λ in the first annular section. When the blurred image photograph was taken by the lens equipped with this diffraction optical element, no concentric striped pattern or central bright spot was seen in the blurred image. Further, when the surface accuracy of this element was measured similarly by the laser interferometer, the astigmatic number was 0.65 and the xenomorphic number was 0.55 in the optically effective portion.

The element manufactured as described above was processed in the same manner as in Example 1, and the refractive index thereof was calculated by performing reflectance measurement. As a result, the refractive index of the second portion of the second resin layer on the center of the first annular section was larger by 0.0005 than the refractive index of the second portion of the second resin layer on the circumference of the first annular section. Besides, the refractive index of the second portion of the second resin layer on the center of the first annular section was larger by 0.0006 than the refractive index of the second portion of the second resin layer on the periphery of the first resin layer. Besides, the refractive index of the first portion was larger by 0.00050 than the refractive index of the second portion of the second resin layer on the center of first annular section.

The diffraction optical element was placed in the low-temperature (−40° C.) test tank and follow-up observation was performed. Then, no failure such as a crack or the like occurred even after one month elapsed. Besides, when the blurred image photograph was taken by the lens equipped with the diffraction optical element after the endurance test, the same result as before the endurance test was obtained.

The results of Examples 1 to 4 and Comparative Examples 1 and 2 are summarized in Table 1.

TABLE 1

| | Example 1 | Example 2 | Comparative Example 1 | Comparative Example 2 | Example 3 | Example 4 |
|---|---|---|---|---|---|---|
| Diameter of $1^{st}$ portion | Φ6 mm (within $1^{st}$ annular section) | Φ12 mm (within $4^{th}$ annular section) | None | Φ55 mm (whole annular section) | Φ20 mm (within $11^{th}$ annular section) | Φ26 mm (within $19^{th}$ annular section) |
| S1/S2 | 1% | 5% | 0% | 100% | 13% | 22% |
| Max transmitted wavefront shift | 0.02λ | 0.02λ | 0.29λ | 0.05λ | 0.02λ | 0.03λ |
| Difference (*1) | 0.0002 | 0.0002 | 0.0100 | 0.0010 | 0.0002 | 0.0005 |
| Difference (*2) | 0.0002 | 0.0002 | 0.0100 | 0.0012 | 0.0003 | 0.0006 |
| Difference (*3) | 0.00045 | 0.0004 | — | — | 0.0005 | 0.0005 |
| State after low temperature test | no crack | no crack | no crack | crack | no crack | no crack |
| Surface accuracy (astigmatic/ xenomorphic) | 0.33/0.43 | 0.35/0.42 | — | — | 0.45/0.45 | 0.65/0.55 |

(*1) = Difference between refractive index of $2^{nd}$ portion on center of $1^{st}$ annular section and refractive index of $2^{nd}$ portion on circumference of $1^{st}$ annular section
(*2) = Difference between refractive index of $2^{nd}$ portion on center of $1^{st}$ annular section and refractive index of $2^{nd}$ portion on periphery of $1^{st}$ annular section
(*3) = Difference between refractive index of $2^{nd}$ resin layer on center of $1^{st}$ annular section and refractive index of $1^{st}$ portion In each of Examples 1 to 4, the shift of the transmitted wavefront was 0.03λ at the maximum, which was smaller than those of Comparative Examples 1 and 2. In Comparative Example 1, since S1/S2 was 0%, the shift of the transmitted wavefront was as large as 0.29λ. In Comparative Example 2, since the second resin layer had the first portion on the entire surface of the first resin layer, cracks occurred after the low temperature test. In each of Examples 1 to 4, the sum of the thickness of the first resin layer and the thickness of the second resin layer was 70 μm or less.

Further, in each of Examples 1 to 3, S1/S2 was as small as 13% or less. Thus, the surface accuracy in each of these examples is favorable as compared with Example 4 because the astigmatic number and the xenomorphic number are both 0.45 or less.

EXPLANATION OF REFERENCE NUMERALS

1 first base material
2 second base material 3 first resin layer
4 second portion of second resin layer
5 first portion of second resin layer
6 first resin
7 mold
8 pressurizing glass
9 ultraviolet irradiation light source
10 molding lens
11 second resin
12 dispenser
13 molding lens
20 diffraction optical element
21 lens
22 lens
23 lens
24 lens
25 lens
26 lens
27 lens
28 lens
30 lens barrel
31 slant surface portion of first resin layer
32 wall surface portion of first resin layer
101 first base material
102 second base material
103 first resin layer
104 second resin layer
201 first base material
202 second base material
203 first resin layer
204 second resin layer
205 third resin layer

EFFECT OF INVENTION

In the diffraction optical element of the present invention, since the refractive index difference occurred in each annular section of the diffraction grating is small, it is possible to reduce the phase shift of the transmitted wavefront caused by the refractive index difference. Besides, it is possible to prevent the crack due to the expansion and contraction of the diffraction grating layer (the first resin layer and the second resin layer) with respect to the base material at the time of temperature change.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151683, filed Aug. 4, 2017, and Japanese Patent Application No. 2018-136002, filed Jul. 19, 2018, which are hereby incorporated by reference herein in their entirety.

What is claimed is:

1. A diffraction optical element comprising a base material, a first resin layer and a second resin layer which are laminated in order, wherein
the first resin layer is configured to have a diffraction grating shape,
the diffraction grating shape is configured to form a plurality of concentric annular sections when planarly viewed from a lamination direction of the diffraction optical element,
the second resin layer is configured to comprise a first portion and a second portion,
the first portion is configured to be provided on at least a first annular section on the first resin layer,
the first annular section is configured to be a circle surrounding a center of the diffraction optical element among the plurality of annular sections,
the second portion is configured to be continuously provided from above the first portion to above a region including a periphery of the first resin layer, and
a difference between a refractive index of the second portion on a center of the first annular section and a refractive index of the second portion on a circumference of the first annular section is within 0.0005.

2. The diffraction optical element according to claim 1, wherein the first portion and the second portion are configured to be made of a same resin.

3. The diffraction optical element according to claim 1, wherein a difference between the refractive index of the second portion on the center of the first annular section and a refractive index of the second portion on the periphery of the first resin layer is within 0.0005.

4. The diffraction optical element according to claim 1, wherein
the diffraction grating shape of the first resin layer is configured to comprise a slant surface portion and a wall surface portion, and
in a case where it is assumed that an area of a surface that the first portion is in contact with the slant surface portion of the diffraction grating shape of the first resin layer is S1 and an area of a surface that the second resin layer is in contact with the slant surface portion of the diffraction grating shape of the first resin layer is S2, S1/S2 is 13% or less.

5. The diffraction optical element according to claim 1, wherein the refractive index of the second portion on the center of the first annular section is larger than a refractive index of the first resin layer.

6. The diffraction optical element according to claim 1, wherein a sum of a thickness of the first resin layer and a thickness of the second resin layer is 70 μm or less.

7. The diffraction optical element according to claim 1, wherein the diffraction grating shape of the first resin layer is configured to comprise a slant surface portion and a wall surface portion, and
in a case where it is assumed that an area of a surface that the first portion is in contact with the slant surface portion of the first resin layer is S1 and an area of a surface that the second resin layer is in contact with the slant surface portion of the first resin layer is S2, S2 is larger than S1.

8. The diffraction optical element according to claim 1, wherein further comprising a second base material on the second resin layer.

9. An optical apparatus comprising a housing, and an optical system disposed inside the housing, wherein
the optical system is configured to have a diffraction optical element and a lens, and
the diffraction optical element is a diffraction optical element comprising a base material, a first resin layer and a second resin layer which are laminated in order, wherein
the first resin layer is configured to have a diffraction grating shape,
the diffraction grating shape is configured to form a plurality of concentric annular sections when planarly viewed from a lamination direction of the diffraction optical element, the second resin layer is configured to comprise a first portion and a second portion, the first portion is configured to be provided on at least a first annular section on the first resin layer, the first annular section is configured to be a circle surrounding a center of the diffraction optical element among the plurality of annular sections, the second portion is configured to be continuously provided from above the first portion to above a region including a periphery of the first resin layer, and a difference between a refractive index of the second portion on a center of the first annular section and a refractive index of the second portion on a circumference of the first annular section is within 0.0005.

* * * * *